United States Patent [19]

Hoefer et al.

[11] 4,293,164

[45] Oct. 6, 1981

[54] BRAKE CONTROL CIRCUIT WITH PARKING AND RETARDING VALVES

[75] Inventors: Wayne A. Hoefer, Blue Springs, Mo.; Paul J. Tanty, Manhattan, Ill.

[73] Assignee: Caterpillar Tractor Co., Peoria, Ill.

[21] Appl. No.: 93,075

[22] PCT Filed: Aug. 13, 1979

[86] PCT No.: PCT/US79/00599

§ 371 Date: Aug. 13, 1979

§ 102(e) Date: Aug. 13, 1979

[87] PCT Pub. No.: WO81/00387

PCT Pub. Date: Feb. 19, 1981

[51] Int. Cl.³ .............................................. B60T 15/16
[52] U.S. Cl. ...................................... 303/13; 303/6 M
[58] Field of Search .................. 188/170; 303/6 M, 9, 303/10, 13, 50, 52

[56] References Cited

U.S. PATENT DOCUMENTS

| | | | |
|---|---|---|---|
| 3,617,096 | 11/1971 | Grabb et al. | 303/13 X |
| 3,917,037 | 11/1975 | Prillinger | 188/170 |
| 3,957,315 | 5/1976 | Cummins et al. | 303/13 X |
| 4,159,854 | 7/1979 | Peterson | 303/6 M |

*Primary Examiner*—Duane A. Reger
*Attorney, Agent, or Firm*—Phillips, Moore, Weissenberger, Lempio & Majestic

[57] ABSTRACT

Conventional fluid control circuits for brakes, including separate parking and retarding valves, include high volume lines and/or complex mechanical linkages to selectively effect the braking functions. This invention provides a relatively non-complex fluid control circuit (10) for closely controlling engagement of brakes (15), including a first valve (25) for controlling engagement of the brakes (15), a pilot line (20), a second valve (47) connected to the pilot line (20), and movable between a closed position and an open position for venting an inlet (28) to the first valve (25), and a third valve (19 or 22) for closing the pilot line (20) and the second valve (47) or for venting the pilot line (20) to open the second valve (47) to vent the inlet (28) to the first valve (25). The third valve (19 or 22) may include interassociated parking (19) and retarder (22) valves adapted for common attachment within a cab of a vehicle for ready access by an operator thereof.

29 Claims, 5 Drawing Figures

BRAKE CONTROL CIRCUIT WITH PARKING AND RETARDING VALVES

TECHNICAL FIELD

This invention relates to a fluid (hydraulic) control circuit, including parking and retarding valves, for controlling the engagement of fluid-actuated couplings, such as brakes.

BACKGROUND ART

A conventional fluid control circuit for selectively engaging service brakes employed on a construction vehicle or the like, normally includes a directional control valve interconnected between an engine-driven pump and the brakes. The brakes may be of the normally engaged type whereby the spring-biased brakes are released upon communication of pressurized hydraulic fluid to actuating chambers thereof. In addition, the control circuit may include separate parking and retarding valves for controlling engagement of the brakes.

The latter valves are normally connected directly to the inlet to the control valve and thus must utilize relatively high volume lines for selectively venting hydraulic fluid from the actuating chambers of the brakes. Alternatively, relatively complex mechanical linkages may be interconnected between an operator control lever and a spool of the control valve to move the spool to an open position venting hydraulic fluid from the actuating chambers of the brakes. Conventional systems of the above type are thus somewhat complex and do not provide for remote location of the brake and retarder valves, adjacent to the operator in the cab of the vehicle.

In addition, conventional braking systems of the above type do not interassociate the parking and retarding valves with each other whereby they may be placed in close proximity for ready access by the operator. The inability to interassociate the parking and retarder valves further complicates the overall control circuit, as will be appreciated by those skilled in the arts relating hereto. In addition, retarder valves are normally of the reciprocal spool type, generally held in set positions by detent mechanisms or the like. Thus, it has proven difficult with these types of valves to infinitely vary the retarding capacity of the brakes of the vehicle.

DISCLOSURE OF THE INVENTION

The present invention is directed to overcoming one or more of the problems as set forth above.

In one aspect of this invention, a fluid control circuit comprises a coupling adapted to be actuated upon controlling of pressurized fluid thereto, and a first valve having an inlet connected to the coupling for controlling the level of pressurized fluid in the coupling and thus the degree of the engagement thereof. The improvement in the control circuit comprises a pilot line, a second valve adapted to be actuated between a closed position and an open position venting pressurized fluid at the inlet of the first valve and connected to the pilot line, and a third valve for closing the pilot line and the second valve, or for venting the pilot line to open the second valve to vent pressurized fluid at the inlet to the first valve and thus in the coupling.

In another aspect of this invention, the third valve includes a parking valve adapted to be actuated between a closed position for closing the pilot line and an open position for venting the pilot line, and a retarder valve for infinitely varying the level of pressurized fluid in the pilot line when the parking valve is in its closed position. The coupling preferably comprises a brake, such as a service brake employed on a construction vehicle.

In another aspect of this invention, the retarder valve comprises a housing having an inlet and an outlet, a spool rotatably mounted in the housing, a cam, and means responsive to rotation of the spool and the cam for infinitely varying communication of pressurized fluid from the inlet to the outlet.

This invention thus provides a fluid control circuit adapted to closely control actuation or engagement of a coupling, such as a service brake employed on a construction vehicle, without having to resort to complex high volume lines, mechanical linkages, or the like. The compact and interassociated mounting of the above parking and retarder valves adapt them for attachment to a steering column of a vehicle, for example, whereby they are readily accessible to the operator.

BRIEF DESCRIPTION OF THE DRAWINGS

Other objects and advantages of this invention will become apparent from the following description and accompanying drawings wherein.

BEST MODE FOR CARRYING OUT THE INVENTION

GENERAL DESCRIPTION

Figure 1:
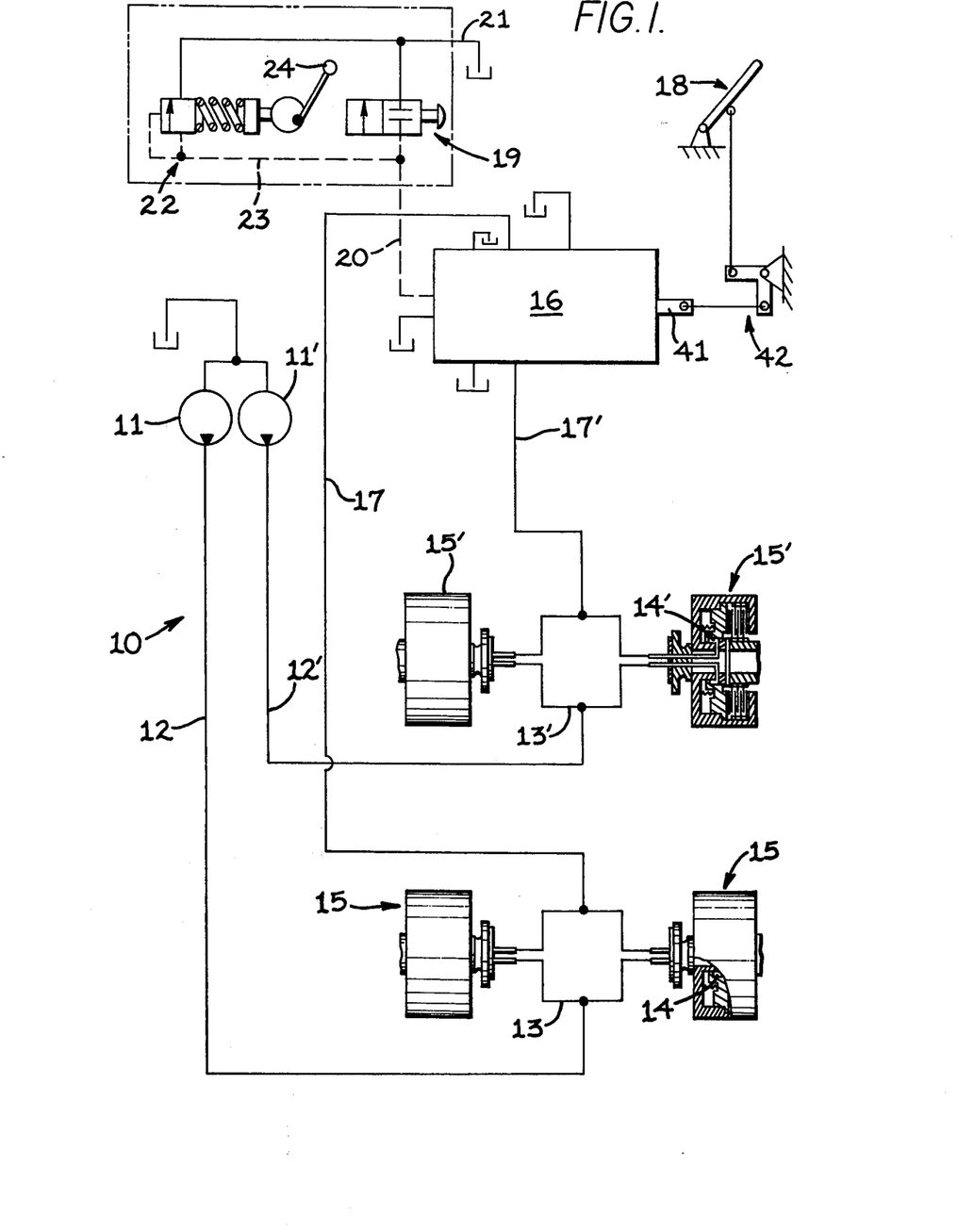
FIG. 1 schematically illustrates a fluid control circuit embodiment of the present invention for selectively actuating service brakes of a vehicle.

FIG. 1 schematically illustrates a fluid control circuit 10 comprising a pair of engine-driven pumps 11 and 11' for discharging pressurized fluid (hydraulic) therefrom in a conventional manner. A pair of lines 12 and 12' connect with lines 13 and 13', respectively, to communicate pressurized fluid to annular actuating chambers 14 and 14' of two sets of service brakes 15 and 15'. Although the invention described herein is particularly adapted for application to service brakes of this type, it will be appreciated by those skilled in the arts relating hereto that other types of applications can be made, with the utilization of fluid actuated couplings (brakes or clutches) in other types of fluid control circuits wherein it is desired to selectively control the engagement of such couplings. In the illustrated application of this invention, brakes 15 and 15' are each preferably of the normally spring-engaged type and releasable by communicating pressurized fluid to actuating chambers 14 and 14' thereof.

When the engine of the vehicle is idling, pressurized fluid from pumps 11 and 11' is communicated through lines 13 and 13' through actuating chambers 14 and 14' of the brakes, and to a control valve 16, via lines 17 and 17'. As described more fully hereinafter, during this phase of engine operation, valve 16 will be conditioned to function as a pressure limiting valve with no operator input at an operator-controlled pedal 18. Continuous circulation of hydraulic fluid through circuit 10 is thus effected to maintain the fluid in a warm and readied condition for efficient operation of valve 16, and brakes 15 and 15' will be maintained in their disengaged conditions of operation. As further described hereinafter, depression of pedal 18 during operation of the vehicle will function to closely modulate and control the desired engagement of brakes 15 and 15' and provide a feedback or "pedal feel", indicating to the operator the degree of brake engagement.

A two-position parking valve 19 is connected to control valve 16 by a pilot line 20 to selectively engage brakes 15 and 15' for parking purposes. In particular, when valve 19 is shifted rightwardly in FIG. 1 to its open or "brake-on" position, pilot line 20 will connect with a vent line 21 to condition valve 16 for maintaining brakes 15 and 15' in their engaged conditions of operation. Positioning of valve 19, as shown in FIG. 1, will block communication of pilot line 20 with vent line 21 to condition valve 16 for selective actuation of brakes 15 and 15', as will be discussed more fully hereinafter.

FIG. 1 further illustrates a retarder valve 22 which is connected to pilot line 20 by a branch line 23 and to vent line 21. As also discussed more fully hereinafter, when parking valve 19 is in its illustrated closed position, manipulation of a handle 24 of retarder valve 22 will function to infinitely vary the fluid pressure in pilot line 20 and thus in actuating chambers 14 and 14' of the brakes to selectively vary the engagement thereof.

CONTROL VALVE 16

Figure 2:
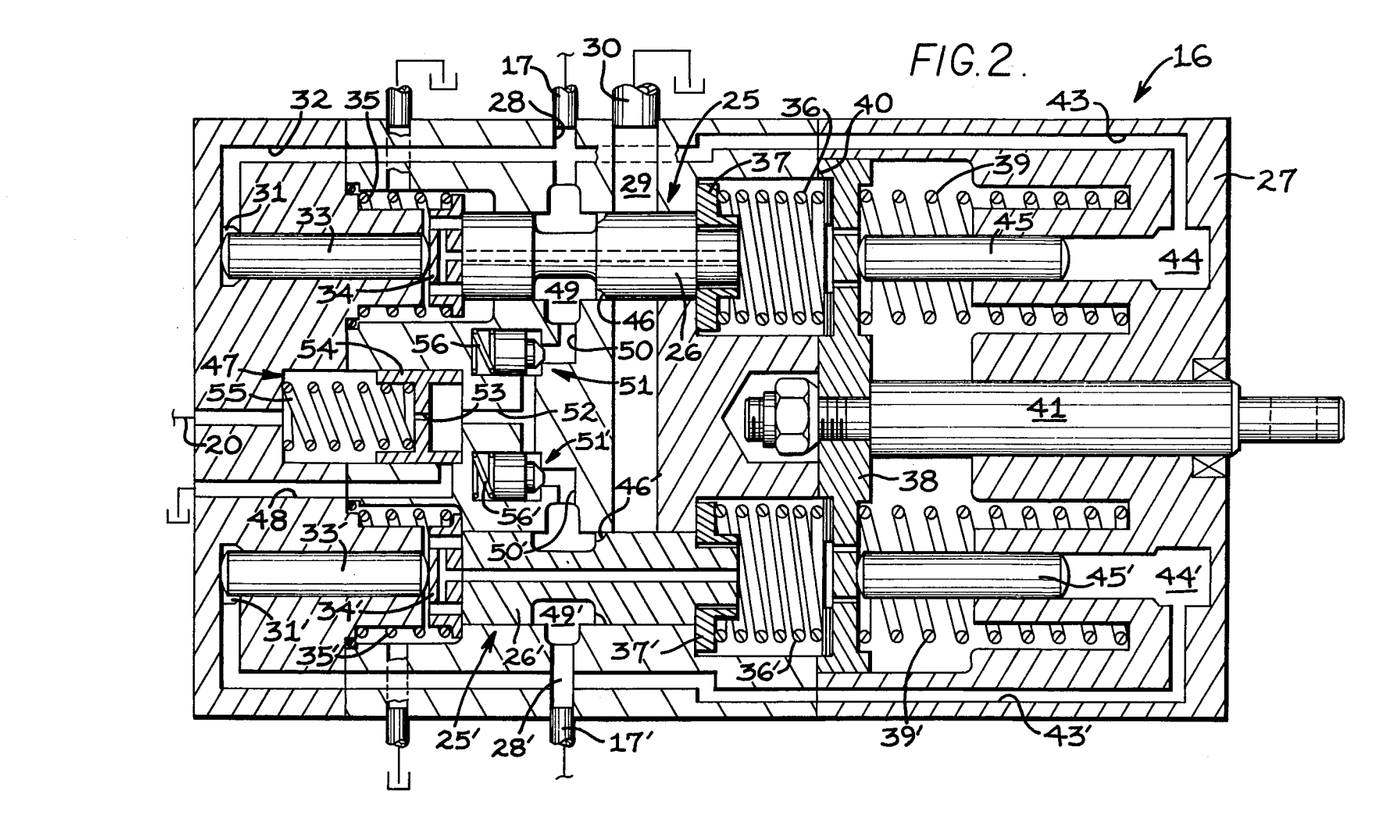
FIG. 2 is an enlarged sectional view illustrating a bank of control valves employed in the fluid control circuit.

Although control valve 16 does not comprise a part of this invention, per se, a general understanding of its operation is necessary for a full understanding of this invention. Referring to FIG. 2, control valve 16 comprises a pair of pressure modulating relief valves 25 and 25' for controlling actuation of brakes 15 and 15', respectively. Since valves 25 and 25' are substantial duplicates of each other, primary emphasis will be placed on describing the specific details of valve 25 with identical numerals being used to depict corresponding constructions of valve 25', with a prime symbol (') accompanying the latter numerals.

Valve 25 comprises a spool 26 reciprocally mounted in a housing 27 of valve 16 for movement between its illustrated closed position, blocking communication between an inlet 28, connected to line 17, and an outlet 29, connected to a vent line 30 communicating with a reservoir, and an open position communicating the inlet with the outlet. An opening force is applied to the left end of spool 26 by fluid pressure communicated to an actuating chamber 31, via a branch passage 32 communicating with inlet 28, through a piston 33 and a retainer 34 for a spring 35. Spring 35 also applies a minimal rightward force to spool 26 to move it towards its open position for communicating inlet 28 with outlet 29.

During operation of the engine, valve 25 will function as a pressure limiting valve to open slightly in response to fluid pressure communicated to chamber 31 from inlet 28 to continuously recirculate hydraulic fluid through brake chambers 14 of brakes 15 to maintain the fluid in a warm and readied condition for efficient operation of the control circuit. A closing force is applied to spool 26 to urge it leftwardly in FIG. 2 by a compression coil spring 36 which is mounted between a retainer 37, mounted on an end of spool 26, and an annular plate 38. A compression coil spring 39 is mounted between housing 27 and plate 38 to urge the plate against a shoulder 40, defined on the housing.

In the illustrated position of plate 38, spring 39 imposes no closing force on spool 26. A variable input force may be applied to valve 25, to progressively reduce the closing force applied to spool 26 thereof by spring 36, by a rod 41 suitably secured to plate 38. Pedal 18 (FIG. 1) is suitably connected to rod 41 by a linkage 42 to selectively move the rod rightwardly in FIG. 2 upon depression of the pedal. As further shown in FIG. 2, it can be seen that rightward movement of rod 41 and plate 38 will move the plate against the opposing force of spring 39 whereby spring 36 will tend to relax.

A second branch passage 43 interconnects inlet 28 with a second actuating chamber 44 to apply a closing force to plate 38, via a piston 45, additive to a force of spring 39 when chamber 44 is pressurized. When the operator depresses pedal 18 (FIG. 1) to move plate 38 rightwardly in FIG. 2, pressurized fluid communicated to actuating chamber 31 from inlet 28 will function to move spool 26 rightwardly to communicate inlet 28 with outlet 29, through metering slots 46 formed on the spool. Actuating chambers 14 of brakes 15 will thus be depressurized a predetermined and modulated amount to engage the brakes in proportion thereto, under control of metering slots 46. As the amount of depression of foot pedal 18 increases, spring 39 will increasingly react against plate 38 and thus valve spool 26, through spring 36, to impose a proportionately increased force, counteracting the input force of the operator.

The operator will thus be provided with a degree of "pedal feel" indicating the degree of engagement of brakes 15. When spool 26 is moved rightwardly to communicate inlet 28 with outlet 29, it should be noted that fluid pressures in chambers 31 and 44 are also relieved. It should be further noted in FIG. 2 that the spring chambers defined in housing 27 are suitably vented in a conventional manner.

As indicated above, valve 25' is a substantial duplicate of valve 25 and thus the above description also substantially applies thereto. It should be noted that plate 38 is common to operation of both valves 25 and 25' for controlling the engagement of brakes 15 and 15' substantially simultaneously. In addition, outlet 29 is common to metering slots 46 and 46' of valve 25 and 25', respectively.

Again referring to FIG. 2, control valve 16 further includes a dump valve means 47 which is responsive to shifting of parking valve 19 from its illustrated closed position to an open position venting pressurized fluid from inlet 28 to a vent passage 48. When valve 19 is in its closed position illustrated in FIG. 1, pressurized fluid is communicated to valve 47 via a chamber 49, a passage 50, a check valve 51, and an inlet passage 52. An orifice 53 is formed centrally through a spool 54 of dump valve means 47 to equalize the fluid pressure on either side of the dump valve to isolate pilot line 20. The force of a compression coil spring 55 of dump valve 47 will thus maintain spool 54 in its illustrated closed position, blocking vent passage 48 as shown in FIG. 2.

Brakes 15 and 15' will thus be disengaged and may be engaged upon the operator's selective actuation of foot pedal 18 and/or handle 24 of retarder valve 22, as described more fully hereinafter.

When the operator desires to engage brakes 15 and 15' for parking purposes, valve 19 shifted rightwardly in FIG. 1 to its open or "brake-on" position to vent pilot line 20 to vent line 21. As a result, a pressure drop will occur across orifice 53 of spool 54 to move the spool leftwardly against the opposed biasing force of spring 55 to uncover vent passage 48. The fluid pressures at inlets 28 and 28' of valves 25 and 25', respectively, and thus the fluid pressures in brake actuating chambers 14 and 14', are relieved to permit engagement of spring-bias brakes 15 and 15'.

In certain applications it may prove desirable to engage all four brakes 15 and 15' for retarding or parking purposes. In such applications, springs 56 and 56' of check valves 51 and 51' respectively, may have the same spring rates and stiffnesses to achieve this result. However, in certain other applications it may prove desirable to provide springs 56 and 56' with different spring rates and to only use brakes 15 for retarding or parking purposes, for example. In this latter application, a "heavier" spring 56' would be employed to prevent opening of check valve 51' whereby only check valve 51 would open and 51' would remain closed upon shifting of valve 19 (FIG. 1) to its open position communicating pilot line 20 with vent line 21.

For example, brakes 15 may be employed in association with the tractor portion of a tractor-scraper whereas brakes 15' may be employed in association with the scraper portion thereof. Should only brakes 15 be equipped with means for cooling them by communicating hydraulic fluid thereto, it would thus prove desirable to only employ brakes 15 (and not brakes 15') as retarding or parking brakes to prevent undue wear of brakes 15'.

PARKING VALVE 19 AND RETARDER VALVE 22

Figure 3:
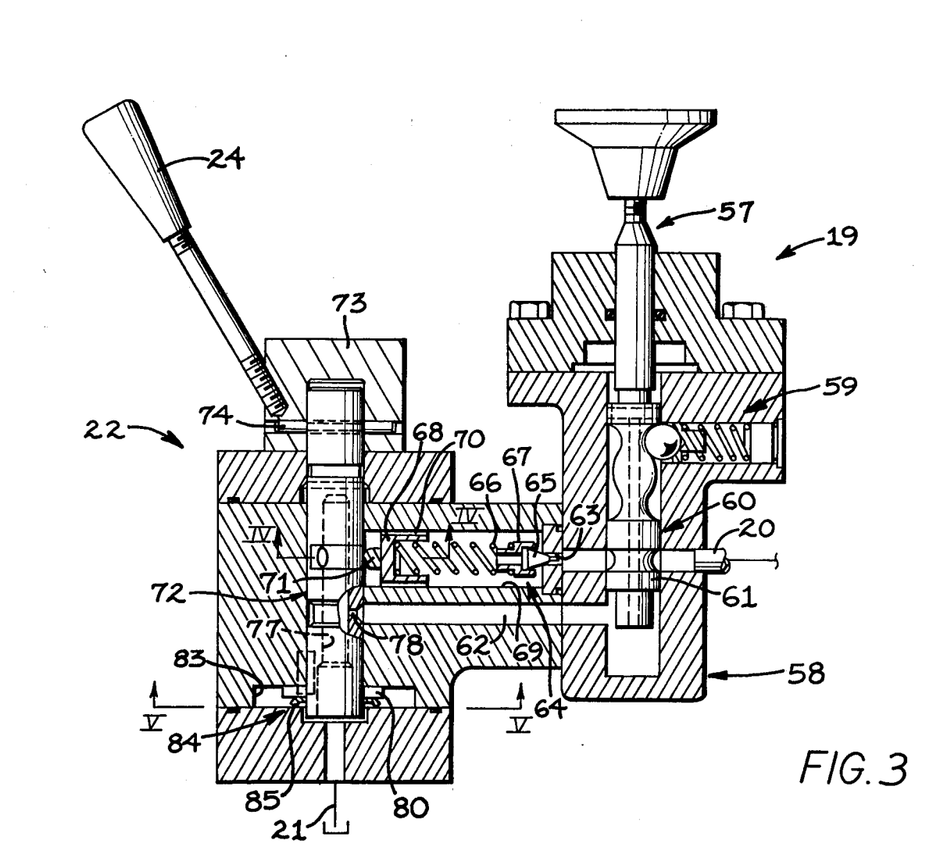
FIG. 3 is an enlarged sectional view illustrating parking and retarder valves employed in the fluid control circuit.

Referring to FIG. 3, parking valve 19 and retarder valve 22 are preferably attached together as an integrated unit for attachment to the steering column of a construction vehicle, for example. The valves are thus made readily accessible to the operator and their common connection to pilot line 20 avoids the need for relatively complex high volume hydraulic lines and/or associated linkages normally employed for effecting the parking brake and retarding functions.

Parking valve 19 comprises a plunger 57 reciprocally mounted in a housing 58 common to both valves. Plunger 57 is movable between its illustrated closed position and a raised open position and is held in each such position by standard detent mechanism 59. A spool 60 is secured to a lower end of plunger 57 and has a land 61 thereon for blocking communication of pilot line 20 with a vent passage 62, defined in housing 58, when plunger 57 is retained in its illustrated closed position by detent mechanism 59. In this position of plunger 57, pilot line 20 communicates with an inlet 63 to a check or poppet valve 64, having a conically shaped poppet 65 biased to a closed position on a seat of inlet 63 by a compression coil spring 66.

Spring 66 is disposed between a retainer 67 for poppet 65 and a plunger 68 which is reciprocally mounted in a bore 69, defined in housing 58. Plunger 68 has a plurality of circumferentially disposed and longitudinally extending slots 70 formed thereon to freely communicate chamber 69 with retarder valve 22. As described more fully hereinafter, a follower 71 is secured on plunger 68 to selectively reciprocate plunger 68 in bore 69 to vary the compressive force applied to spring 66 in response to actuation of retarder valve 22 to vary the closing force applied to poppet 65 whereby fluid pressure in pilot line 20 may be infinitely varied.

Retarder valve 22 comprises a rotary spool 72, mounted in housing 58 and adapted to be rotated by handle 24. The upper end of spool 72 is suitably secured to a cap 73, having handle 24 secured thereto by a cross pin 74. As more clearly shown in FIG. 4, a follower 71 of plunger 68 engages a cam 75, formed on spool 72, for infinitely varying the closing force on poppet 65 (FIG. 3) upon clockwise rotation of the spool.

Figure 4:
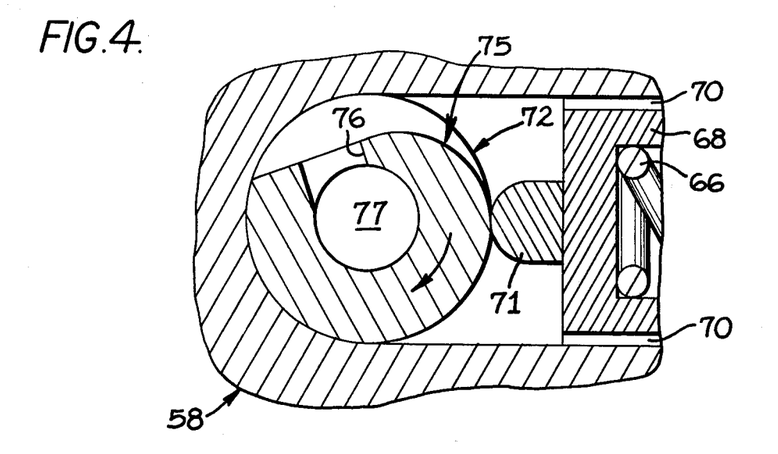
FIGS. 4 and 5 are sectional views through the retarder valve, taken in the direction of arrows IV—IV and V—V, respectively, in FIG. 3.

In the rotative position of spool 72 in FIG. 4, a maximum closing force is applied to poppet 65 by cam 75, through spring 66 and plunger 68, whereby pilot line 20 will remain isolated to permit full disengagement of brakes 15 and 15'. Clockwise rotation of spool 72 in FIG. 4 through approximately 90° to its minimum setting will reduce the closing force applied to poppet 65 to substantially zero whereby the poppet will be enabled to fully open to exhaust pilot line 20 whereby brakes 15 and 15' can become fully engaged. It should be further noted in FIG. 4 that slots 70, formed on plunger 68, continuously communicate with vent line 21, via a port 76 and a longitudinal passage 77 formed in spool 72. Referring once again to FIG. 3, then passage 62 also continuously communicates with vent line 21 via a port 78 formed in spool 72.

Figure 5:
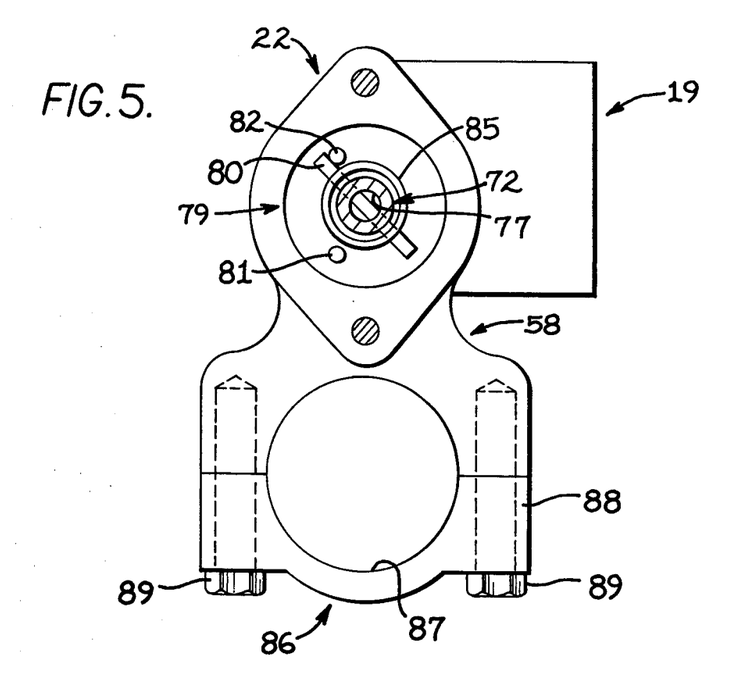

FIG. 5 illustrates a stop means 79 for limiting rotation of spool 72 between its two extreme positions, controlling the closing force applied to check valve 64. Stop means 79 comprises a cross-pin 80 secured to a lower end of spool 72 and a pair of stop pins 81 and 82 secured to housing 58. Stop means 79 is accommodated in a recess 83, defined in multi-part housing 58. A biasing means 84, shown in the form of a Belleville spring washer 85, is mounted between housing 58 and cross-pin 80 to urge the cross pin into frictional engagement with the housing whereby spool 72 will be held by friction in any desired rotative position selected by the operator.

INDUSTRIAL APPLICABILITY

As described above, fluid control circuit 10 finds particular application to braking systems wherein it is desired to provide an operator with ready access to parking valve 19 and retarder valve 22. As shown in FIG. 5, the unitized and interassociated parking and retarder valves may be secured to a steering column of the vehicle by a mounting bracket 86 secured to housing 58. The bracket defines a cylindrical bore 87 therein, conforming to the steering column, closed by a cap 88 and bolts 89. The utilization of pilot line 20, interconnected between control valve 16 and parking and retarder valves 19 and 22, eliminates the need for relatively complex high volume lines, mechanical linkages and the like.

Assuming that the vehicle is at rest with the engine running, during a parking mode of vehicle operation, parking valve 19 (FIG. 1) would be shifted rightwardly to its "brake-on" open position to vent pilot line 20 to tank, via vent line 21. As shown in FIG. 3, raising of plunger 57 to its raised position will communicate pilot line 20 with vent line 21, via vent passage 62, port 78, and passage 77. As described above, with reference to FIG. 2, the pressure differential thus created across orifice 53 of dump valve 47 will function to move spool 54 thereof leftwardly to vent brake chambers 14 and 14', via inlets 17 and 17', check valves 56 and 56', and vent passage 48. The standard springs employed in brakes 15 and 15' will thus function to engage the brakes for parking purposes.

Upon shifting of parking valve 19 to its "brake-off" closed position illustrated in FIG. 1, brakes 15 and 15' will be released by pressurizing actuating chambers 14 and 14' thereof and control valve 16 will be conditioned for vehicle operation and selective engagement of the brakes. In particular, pilot line 20 is now isolated whereby the pressure on either side of orifice 53 of dump valve 47 is equalized whereby spring 55 thereof will move spool 54 to its closed position illustrated in FIG. 2, blocking communication between passage 52 and vent passage 48.

Should system pressures reflected in lines 17 and 17' exceed a predetermined maximum level, such as 2800 kPa (400 psi), the fluid pressure communicated to actuating chambers 31 and 31' of valves 25 and 25', respectively, will function to shift spools 26 and 26' thereof rightwardly to relieve the excess pressure through metering slots 46 and 46' and common outlet passage 29. This pressure limiting and modulating function is controlled by the opposed force of springs 36 and 36' which thus counteract the combined forces imposed on spools 26 and 26' by the fluid pressure prevalent in chambers 31 and 31' and springs 35 and 35'. During this condition of operation of control circuit 10, wherein no operator input is applied to foot pedal 18, springs 39 and 39'are inactivated and do not function to apply any closing force on spools 26 and 26', respectively.

During operation of the vehicle, the operator will encounter situations wherein it will prove desirable to at least partially engage brakes 15 and 15'. Brakes 15 and 15' now acting as service brakes, may be progressively engaged by depressing pedal 18 to move rod 41 and plate 38 rightwardly in FIG. 2 against the opposed forces of springs 39 and 39'. Rightward movement of plate 38 will tend to relax springs 36 and 36' whereby spools 26 and 26'will shift rightwardly to effect a gradual reduction in the fluid pressures in lines 17 and 17', as controlled by the gradual opening of metering slots 46 and 46'. Such gradual reduction of fluid pressure in lines 17 and 17' will responsively effect a gradual engagement of brakes 15 and 15' by reducing the fluid pressure in actuating chambers 14 and 14' thereof.

The operator may also engage brakes 15 and 15' under control of retarder valve 22. Referring to FIGS. 3 and 4, rotation of handle 24 of retarder valve 22, assuming that parking valve 19 remains closed as illustrated in FIG. 1, will gradually relax the force applied to spring 66 of poppet valve 64 under control of cam 75 and plunger 68. Relaxation of spring 66 will permit poppet 65 to open the desired amount to bleed fluid from pilot line 20 to vent line 21, via inlet 63 to poppet valve 64, chamber 69, slots 70, port 76, and passage 77 formed in spool 72 of retarder valve 22.

In response to such reduction in fluid pressure in pilot line 20, a pressure differential will be created across orifice 53 of dump valve 47 (FIG. 2) thus moving dump valve 47 to uncover vent passage 48. The pressure in lines 17 and 17' is thus reduced a proportionate amount with fluid being passed through check valves 56 and 56' and branch passage 52.

As described above, in certain applications it may prove desirable to only employ brakes 15, for example, for vehicle retarding purposes such as when the vehicle is on a down-hill run. In such an application, spring 56' of check valve 51' would be constructed substantially stiffer than spring 56 of check valve 51 to prevent opening of check valve 51'. Therefore, actuation of retarder valve 22 would only effect engagement of brakes 15 to retard the vehicle.

Other aspects, objects, and advantages of this invention can be obtained from a study of the drawings, the disclosure, and the appended claims.

We claim:

1. In a fluid control circuit (10) having fluid actuated coupling means (15) for being actuated upon controlled communication of pressurized fluid thereto, and first valve means (25) for controlling the level of pressurized fluid in said coupling means (15) and the degree of engagement thereof, said first valve means (25) having an inlet (28) connected to said coupling means (15), the improvement comprising a pilot line (20),
   second valve means (47) for actuation between a closed position and an open position venting pressurized fluid at the inlet (28) of said first valve means (25) and connected to said pilot line (20), and
   third valve means (19 or 22) for closing said pilot line (20) and said second valve means (47), or for venting said pilot line (20) to open said second valve means (47) to vent pressurized fluid at the inlet (28) of said first valve means (25) and in said coupling means (15).

2. The control circuit of claim 1 wherein said coupling means (15) is normally engaged and is disengaged upon pressurization of the actuating chamber (14) thereof.

3. The control circuit of claim 2 wherein said coupling means (15) constitutes a brake.

4. The control circuit of claim 1 wherein said second valve means (47) includes dump valve means (47) for actuation between said closed position in response to isolation of said pilot line (20) by said third valve means (19 or 22) and an open position at least partially venting said pilot line (20) through said third valve means (19 or 22).

5. The control circuit of claim 4 wherein said dump valve means (47) includes an inlet passage (52) connected to the inlet (28) of said first valve means (25), a vent passage (48), a reciprocal spool (54) movable between said closed position blocking communication of said inlet passage (52) with said vent passage (48) and an open position communicating said inlet passage (52) with said vent passage (48).

6. The control circuit of claim 5 wherein said dump valve means (47) further includes orifice means (53), formed in said spool (54), for creating a differential pressure thereacross and between said inlet passage (52) and said pilot line (20) when said third valve means (19 or 22) is venting said pilot line (20) to open said dump valve means (47), and biasing means (55) for moving said spool (54) to said closed position blocking communication between said inlet passage (52) and said vent passage (48) when said third valve means (19 or 22) closes said pilot line (20).

7. The control circuit of claim 4 further including a second said coupling means (15') for being selectively engaged upon communication of pressurized fluid thereto and another said first valve means (25'), having an inlet (28') connected to said second coupling means (15'), for controlling the level of pressurized fluid in said second coupling means (15'), said dump valve means (47) connected to the inlets (28,28') of each of said first valve means (25,25').

8. The control circuit of claim 7 further including check valve means (51,51'), interconnected between said dump valve means (47) and each of the inlets (28,28') of each of said first valve means (25,25'), for opening when the level of pressurized fluid in a respective one of said inlets (28,28) exceeds a predetermined level.

9. The control circuit of claim 8 wherein only one of said check valve means (56) opens to communicate pressurized fluid from a respective one of said inlets (28) to said dump valve means (47).

10. The control circuit of claim 1 wherein said third valve means includes parking valve means (19) for movement between a closed position blocking communication of said pilot line (20) with a vent line (21) and an open position communicating said pilot line (20) with said vent line (21).

11. The control circuit of claim 10 wherein said third valve means further includes retarder valve means (22) for infinitely varying fluid pressure in said pilot line (20) when said parking valve means (19) is in its closed position.

12. The control circuit of claim 11 further including a housing (58) common to each of said parking valve means (19) and said retarder valve means (22) and means (86) for detachably securing said housing (58) to a steering column of a vehicle.

13. The control circuit of claim 11 further including poppet valve means (64), having an inlet (63) communicating with said pilot line (20) and interconnected between said parking valve means (19) and said retarder valve means (22), for opening in response to actuation of said retarder valve means (22) to vent fluid pressure to said vent line (21), when said parking valve means (19) is in its closed position.

14. The control circuit of claim 13 wherein said poppet valve means (64) includes a poppet (65) mounted at the inlet (63) thereof and biasing means (66) for urging said poppet (65) towards a closing position on said inlet (63) and wherein said retarder valve means (22) further includes means (68,75) for selectively varying a closing force applied to said biasing means (66) urging said poppet (65) towards its closing position on the inlet (63) to said poppet valve means (64).

15. The control circuit of claim 14 wherein said last-mentioned means (68,75) includes a reciprocal plunger (68) engaging said biasing means (66), a rotatable spool (72) having cam means thereon (75) for reciprocating said plunger (68) to vary the closing force on said biasing means (66) upon rotation of said spool (72).

16. The control circuit of claim 15 further including a longitudinal passage (77) defined in said spool (72) and communicating with said vent line (21), at least one slot means (70), defined on said plunger (68) for intercommunicating said poppet valve means (64) with said spool (72) and port means (76), defined in said spool (72), for communicating said slot means (70) with said longitudinal passage (77).

17. The control circuit of claim 16 further including a port (78) defined in said spool (72) and vent passage means (62) for communicating pressurized fluid from said pilot line (20), through said port (78), and to said longitudinal passage (77) when said parking valve means (19) is in its open position.

18. The control circuit of claim 15 further comprising stop means (79) for limiting rotary movement of said spool (72) between a first position closing said pilot line (20) and a second position fully opening said pilot line (20).

19. The control circuit of claim 15 further including a housing (58) having said spool (72) rotatably mounted therein and means (84) for frictionally holding said spool (72) in a selected rotational position of operation.

20. In a fluid control circuit (10) having fluid actuated brake means (15) for being actuated upon controlled communication of pressurized fluid thereto, control valve means (16) for controlling the level of pressurized fluid in said brake means (15), the improvement comprising a pilot line (20) connected to said control valve means (16), parking valve means (19) for actuation between a closed position closing said pilot line (20), and an open position venting pressurized fluid from said brake means (15), through said control valve means (16) and said pilot line (20), and retarder valve means (22) for infinitely varying the level of pressurized fluid in said brake means (15), through said control valve means (16) and said pilot line, when said parking valve means (19) is in its closed position.

21. The control circuit of claim 20 further including poppet valve means (64), having an inlet (63) communicating with said pilot line (20) and interconnected between said parking valve means (19) and said retarder valve means (22), for opening in response to actuation of said retarder valve means (22) to vent fluid pressure to a vent line (21), when said parking valve means (19) is in its closed position.

22. The control circuit of claim 21 wherein said poppet valve means (64) includes a poppet (65) mounted in the inlet (63) thereof and biasing means (66) for urging said poppet (65) towards a closing position on said inlet (63) and wherein said retarder valve means (22) further includes means (68,75) for selectively varying a closing force applied to said biasing means (66) urging said poppet (65) towards its closing position on the inlet (63) to said poppet valve means (64).

23. The control circuit of claim 22 wherein said last-mentioned means (68,75) includes a reciprocal plunger (68) engaging said biasing means (66), a rotatable spool (72) having cam means thereon (75) for reciprocating said plunger (68) to vary the closing force on said biasing means (66) upon rotation of said spool (72).

24. The control circuit of claim 23 wherein said cam means (75) is defined on said spool (72).

25. The control circuit of claim 24 further including a longitudinal passage (77) defined in said spool (72) and communicating with said vent line (21), at least one slot means (70), defined on said plunger (68) for intercommunicating said poppet valve means (64) with said spool (72) and port means (76), defined in said spool (72), for communicating said slot means (70) with said longitudinal passage (77).

26. The control circuit of claim 25 further including a port (78) defined in said spool (72) and vent passage means (62) for communicating pressurized fluid from said pilot line (20), through said port (78), and to said longitudinal passage (77) when said parking valve means (19) is in its open position.

27. The control circuit of claim 23 further comprising stop means (79) for limiting rotary movement of said spool (72) between a first position closing said pilot line (20) and a second position fully opening said pilot line (20).

28. The control circuit of claim 23 further including a housing (58) having said spool (72) rotatably mounted therein and means (84) for frictionally holding said spool (72) in a selected rotational position of operation.

29. The control circuit of claim 20 further including a housing (58) common to each of said parking valve means (19) and said retarder valve means (22) and means for detachably securing said housing (58) to a steering column of a vehicle.

* * * * *